(12) United States Patent
Saito et al.

(10) Patent No.: US 9,771,078 B2
(45) Date of Patent: Sep. 26, 2017

(54) HAULAGE VEHICLE

(71) Applicant: Hitachi Construction Machinery Co., Ltd., Taito-ku, Tokyo (JP)

(72) Inventors: Shinjiro Saito, Kasumigaura (JP); Hidefumi Ishimoto, Toride (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 0 days.

(21) Appl. No.: 15/124,074

(22) PCT Filed: Sep. 30, 2014

(86) PCT No.: PCT/JP2014/076082
§ 371 (c)(1),
(2) Date: Sep. 7, 2016

(87) PCT Pub. No.: WO2016/051501
PCT Pub. Date: Apr. 7, 2016

(65) Prior Publication Data
US 2017/0015322 A1   Jan. 19, 2017

(51) Int. Cl.
*B60W 30/182* (2012.01)
*B60W 10/20* (2006.01)
(Continued)

(52) U.S. Cl.
CPC .......... *B60W 30/182* (2013.01); *B60W 10/04* (2013.01); *B60W 10/18* (2013.01);
(Continued)

(58) Field of Classification Search
CPC .... B60W 30/182; B60W 10/04; B60W 10/18; B60W 10/20; B60W 2300/125;
(Continued)

(56) References Cited

U.S. PATENT DOCUMENTS 5,265,946 A * 11/1993 Bader .................... B60T 8/172
303/146
5,357,798 A * 10/1994 Weinzerl ............. B60T 8/17551
701/1
(Continued)

FOREIGN PATENT DOCUMENTS

JP         8-76846 A     3/1996
JP     DE 19643168 A1 *  4/1997 ............ B60T 8/1755
(Continued)

OTHER PUBLICATIONS

Yoshiaki et al., "Simulation results of novel energy storage equipment series-connected to the traction inverter," Year: 2007, pp. 1-9.*
(Continued)

*Primary Examiner* — Tuan C. To
(74) *Attorney, Agent, or Firm* — Crowell & Moring

(57) ABSTRACT

An autonomous mode controller (61) that outputs an acceleration command (SAa), a braking command (SBa) and a torque command (Ta) is connected to a steering actuator (33) and a traveling drive unit (52). The steering actuator (33) generates combined torque (T1) based upon steering torque (Tm) from a steering handle (32) and the torque command (Ta), and controls a steering angle (θ) of a vehicle based upon the combined torque (T1). The traveling drive unit (52) selects a larger one of an acceleration command (SAm) by an accelerator pedal (50) and the acceleration command (SAa) as an acceleration command (SA), and selects a larger one of a braking command (SBm) by a brake pedal (51) and the acceleration command (SBa) as a braking command (SB). The traveling drive unit (52) controls a vehicle speed based upon the acceleration command (SA) and the braking command (SB).

6 Claims, 8 Drawing Sheets

(51) Int. Cl.
  *B60W 10/04* (2006.01)
  *B60W 10/18* (2012.01)
  *G05D 1/00* (2006.01)
  *G05D 1/02* (2006.01)

(52) U.S. Cl.
  CPC ........... *B60W 10/20* (2013.01); *G05D 1/0088* (2013.01); *G05D 1/0212* (2013.01); *G05D 1/0223* (2013.01); *B60W 2300/125* (2013.01); *B60W 2600/00* (2013.01); *B60W 2710/18* (2013.01); *B60W 2710/202* (2013.01); *B60W 2720/106* (2013.01); *G05D 2201/0202* (2013.01)

(58) Field of Classification Search
  CPC ......... B60W 2600/00; B60W 2710/18; B60W 2710/202; B60W 2720/106; G05D 1/0088; G05D 1/0212; G05D 1/0223; G05D 2201/0202
  See application file for complete search history.

(56) References Cited

U.S. PATENT DOCUMENTS

| | | | |
|---|---|---|---|
| 5,469,356 A | | 11/1995 | Hawkins et al. |
| 5,890,993 A | * | 4/1999 | Horiguchi ............ F16H 61/0213 477/94 |
| 6,009,366 A | * | 12/1999 | Burkhard .............. B60T 8/1764 180/197 |
| 6,567,748 B2 | * | 5/2003 | Matsuno ................... B60T 7/22 180/274 |
| 2001/0000338 A1 | * | 4/2001 | IlJima ..................... F16H 61/14 477/62 |
| 2002/0096936 A1 | | 7/2002 | Ishida et al. |
| 2005/0096183 A1 | * | 5/2005 | Watanabe .............. B60K 31/04 477/182 |
| 2012/0271499 A1 | | 10/2012 | Inoue et al. |
| 2014/0046566 A1 | * | 2/2014 | Maitlen ................. B60T 8/1701 701/70 |
| 2014/0207364 A1 | * | 7/2014 | Eidehall ............. B62D 15/0265 701/301 |
| 2014/0324283 A1 | * | 10/2014 | Kim ........................ B60T 17/22 701/33.9 |
| 2017/0144661 A1 | * | 5/2017 | Miller ................. B60W 30/143 |

FOREIGN PATENT DOCUMENTS

| | | | | |
|---|---|---|---|---|
| JP | 2001-188611 A | | 7/2001 | |
| JP | 2002-120744 A | | 4/2002 | |
| JP | EP 1225110 A1 | * | 7/2002 | ................ B60T 8/24 |
| JP | 2002-220039 A | | 8/2002 | |
| JP | 2007032381 A | * | 2/2007 | |
| JP | 2007-216776 A | | 8/2007 | |
| JP | 2008120143 A | * | 5/2008 | |
| JP | 2013-203341 A | | 10/2013 | |
| WO | WO 2010/146631 A1 | | 12/2010 | |

OTHER PUBLICATIONS

Jens et al., "Design of a powermanagement for a battery buffer system in an electric lift truck by means of fuzzy control and genetic algorithm," Year: 2011, pp. 1-10.*

International Search Report (PCT/ISA/210) issued in PCT Application No. PCT/JP2014/076082 dated Dec. 22, 2014, with English translation (three (3) pages).

Japanese Office Action issued in counterpart Japanese Application No. 2016-551384 dated Jun. 27, 2017 (four (4) pages).

* cited by examiner

HAULAGE VEHICLE

TECHNICAL FIELD

The present invention relates to haulage vehicles such as a dump truck.

BACKGROUND ART

As haulage vehicles, there is known a dump truck that carries transporting objects such as crushed stones at a working site like mines (for example, refer to Patent Document 1). The dump truck described in Patent Document 1 has an autonomous traveling mode of autonomously traveling based upon various kinds of commands and a manual traveling mode of traveling by an operation of an operator in the truck, and travels in one of the modes selected by a mode selecting signal.

PRIOR ART DOCUMENT

Patent Document

Patent Document 1: Japanese Patent Laid-Open No. Hei 8-76846 A

SUMMARY OF THE INVENTION

Incidentally, the haulage vehicle described in Patent Document 1 is provided with a machine control module that is operable to correspond to the selected mode out of the autonomous traveling mode and the manual traveling mode. The machine control module receives a steering signal and a speed requirement signal from a navigator in the autonomous traveling mode and receives a steering signal and a speed requirement signal from a steering wheel, an accelerator pedal and a brake pedal in the manual traveling mode. The machine control module controls a steering angle of a vehicle body and a vehicle body speed in response to the received steering signal and speed requirement signal.

However, the dump truck described in Patent Document 1 operates in one of the autonomous traveling mode and the manual traveling mode. Therefore, even when an operator performs an acceleration operation or a braking operation (retard operation), for example, in a state where the autonomous traveling mode is selected, these manual operations become invalid. As a result, there is a problem that even when the operator who has got in the vehicle performs the braking operation during the autonomous travel, the operator cannot stop the vehicle.

In addition, the dump truck described in Patent Document 1 inputs a signal of a manual operation to the machine control module for performing the autonomous travel. Therefore, there is a tendency that it is difficult to add a function of the autonomous travel to the existing dump truck operable on a basis of the manual operation.

The present invention is made in view of the aforementioned problems in the conventional art, and an object of the present invention is to provide a haulage vehicle that can perform a manual operation even during an autonomous travel.

For solving the aforementioned problems, according to the present invention, a haulage vehicle comprises: an acceleration operation device that operates acceleration of a vehicle; a braking operation device that operates a brake of the vehicle; and a traveling drive unit that causes the vehicle to travel based upon an acceleration command by the acceleration operation device and a braking command by the braking operation device, characterized in that: the traveling drive unit comprises: an external input terminal for inputting another acceleration command and another braking command from an exterior; an acceleration command selecting unit that selects a larger acceleration command by comparing the other acceleration command input from the external input terminal and the acceleration command by the acceleration operation device; and a braking command selecting unit that selects a larger braking command by comparing the other braking command input from the external input terminal and the braking command by the braking operation device, wherein a traveling drive of the vehicle is controlled based upon the acceleration command selected by the acceleration command selecting unit and the braking command selected by the braking command selecting unit.

According to the present invention, the acceleration command selecting unit selects the larger acceleration command out of the other acceleration command input from the external input terminal and the acceleration command by the acceleration operation device, and the braking command selecting unit selects the larger braking command out of the other braking command from the external input terminal and the braking command input by the braking operation device. Therefore, the traveling drive unit can accelerate or decelerate the vehicle based upon the acceleration command selected by the acceleration command selecting unit and the braking command selected by the braking command selecting unit.

In addition, the braking command selecting unit selects the larger braking command out of the other braking command input from the external input terminal and the braking command by the braking operation device. Therefore, for example, even during the autonomous travel, the operation of the braking operation device by the operator who has got in the vehicle enables the braking command selecting unit to select the braking command by the braking operation device. As a result, it is possible to perform the manual operation even during the autonomous travel.

Further, since the traveling drive unit is provided with the external input terminal, a function of the autonomous traveling mode can be added by inputting the acceleration command and the braking command for autonomous travel to the external input terminal.

MODE FOR CARRYING OUT THE INVENTION

Hereinafter, a haulage vehicle according to an embodiment of the present invention will be in detail explained with reference to the accompanying drawings, by taking a dump truck as an example.

In the figure, a dump truck 1 is a large-sized haulage vehicle, which includes a vehicle body 2, a vessel 3, a cab 5, front wheels 6L and 6R, rear wheels 7L and 7R, and the like.

Figure 1:
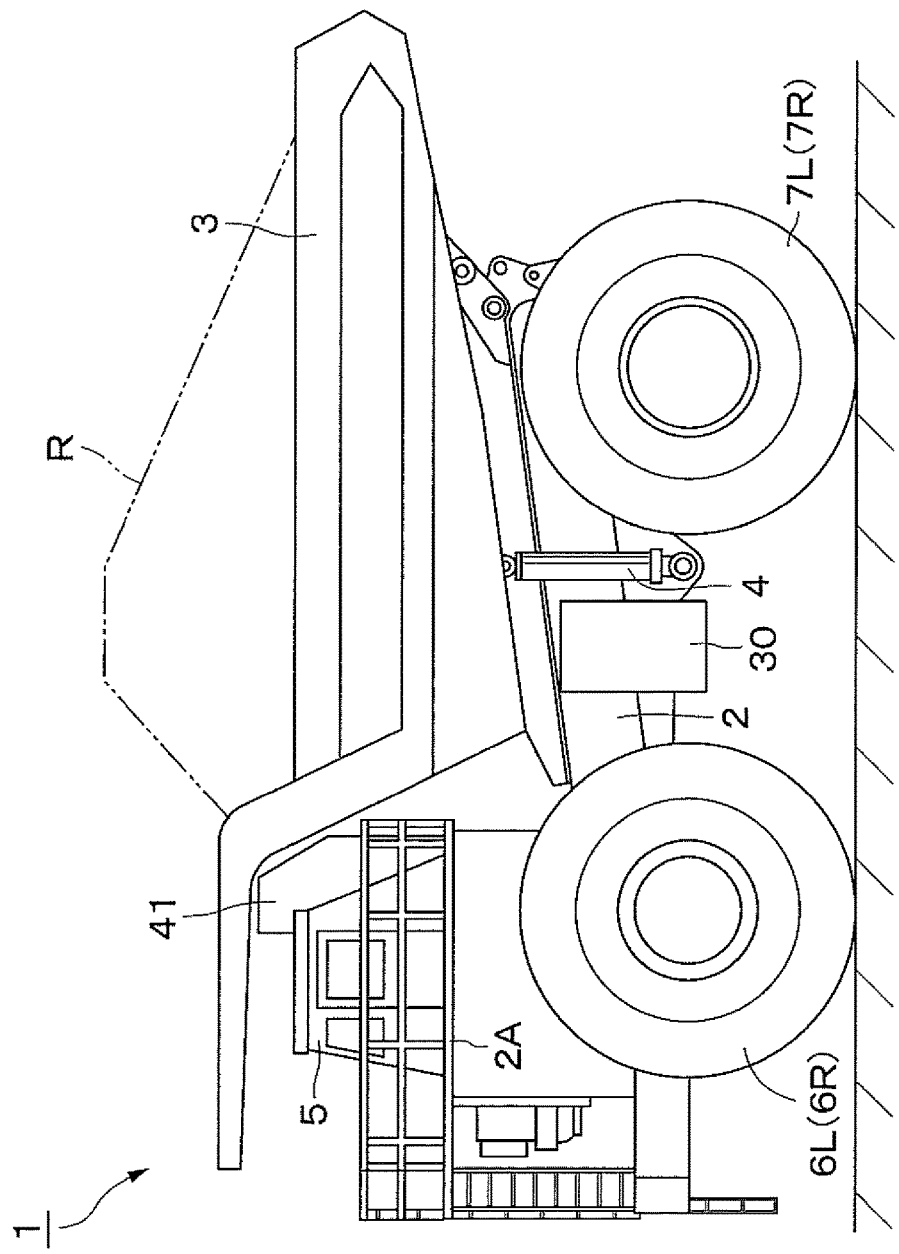
FIG. 1 is a front view showing a dump truck according to an embodiment in the present invention.
Figure 2:
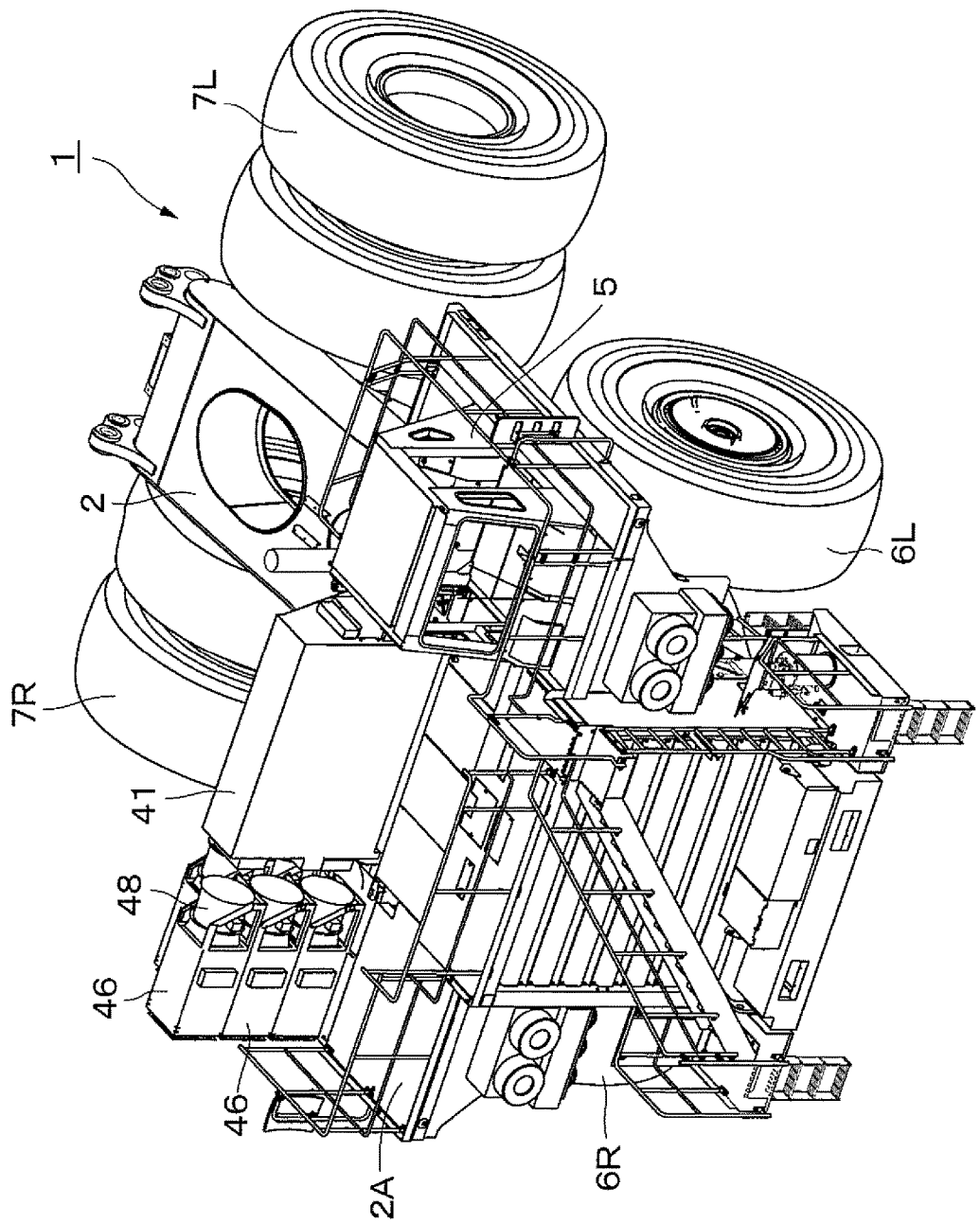
FIG. 2 is a perspective view showing the dump truck with a vessel being removed.

As shown in FIG. 1 and FIG. 2, the vehicle body 2 forms a frame structure. The vessel 3 as a loading platform is mounted on an upper side of the vehicle body 2 to be capable of being tilted (lifted) on a basis of a rear portion side of the vehicle body 2 as a fulcrum by a hoist cylinder 4.

The cab 5 is provided on an upper side of a front portion of the vehicle body 2 to be located in the front side of the vessel 3. The cab 5 defines therein an operator's room where an operator of the dump truck 1 gets in/off. An operator's seat and an engine switch (any thereof is not shown) are provided within the cab 5, and further, a steering handle 32, an accelerator pedal 50 and a brake pedal 51 to be described later are provided.

Left and right front wheels 6L and 6R are rotatably provided in the lower side of the front portion of the vehicle body 2. The front wheel 6L is arranged in the left side of the vehicle body 2 and the front wheel 6R is arranged in the right side of the vehicle body 2. The left and right front wheels 6L and 6R form part of steering wheels whose steering angle θ changes by steering cylinders 27L and 27R to be described later. Each of the left and right front wheels 6L and 6R is formed having a tire diameter (outer diameter dimension) of, for example, as much as 2 to 4 meters in the same way as rear wheels 7L and 7R to be described later. The left and right front wheels 6L and 6R are steered by the extending and contracting operations of the steering cylinders 27L and 27R when an operator of the dump truck 1 operates the steering handle 32 to be described later.

The rear wheels 7L and 7R are rotatably provided in the rear portion side of the vehicle body 2. The rear wheel 7L is arranged in the left side of the vehicle body 2 and the rear wheel 7R is arranged in the right side of the vehicle body 2. The left and right rear wheels 7L and 7R form driving wheels of the dump truck 1 and are driven by wheel drive motors 13L and 13R to be described later to be rotated. The dump truck 1 is driven to travel by driving and rotating the left and right rear wheels 7L and 7R.

Figure 6:
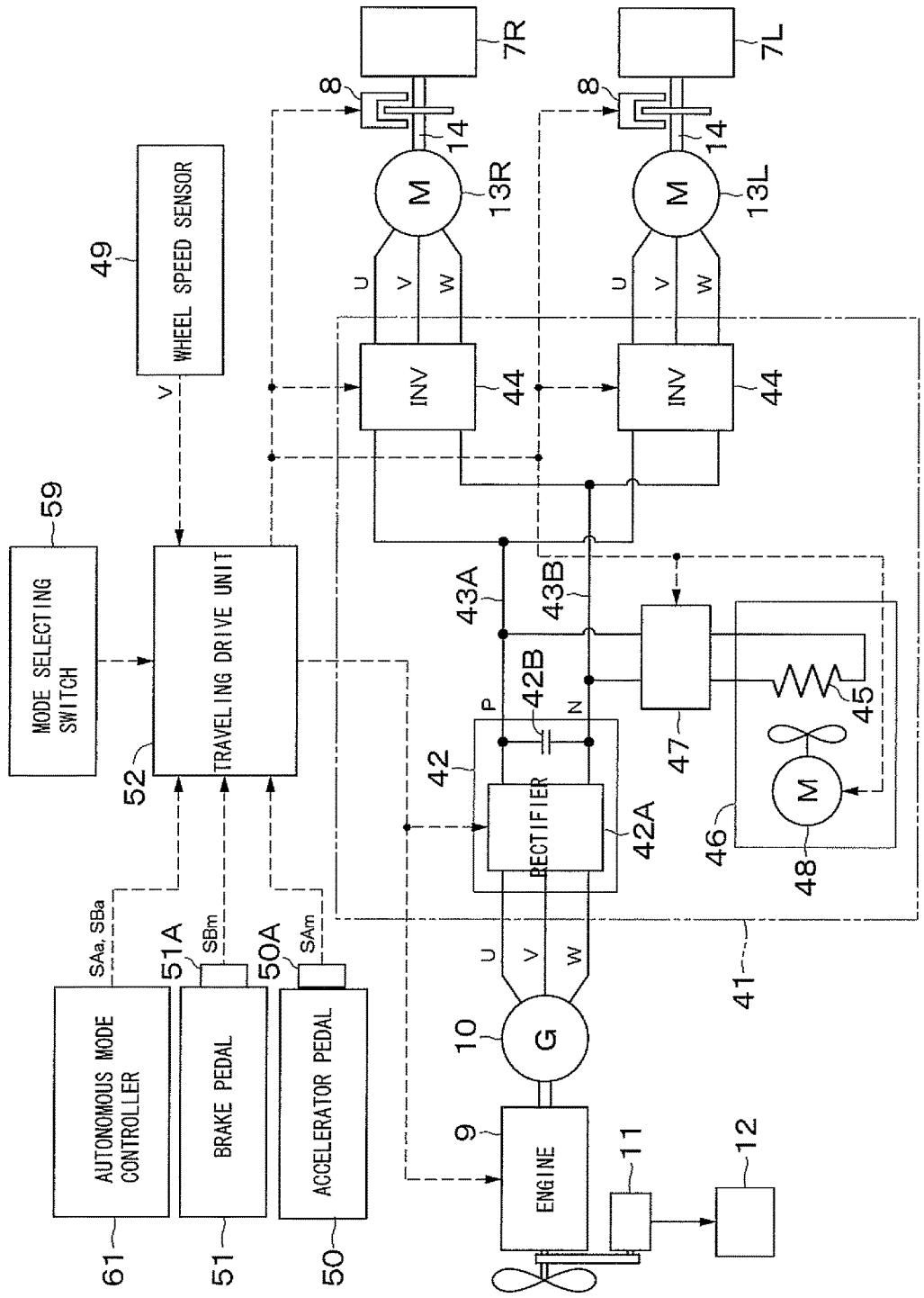
FIG. 6 is an electrical circuit diagram showing an electrical system for traveling drive in the dump truck.

As shown in FIG. 6, the front wheels 6L, 6R and the rear wheels 7L, 7R are provided with mechanical braking devices 8 such as disc brakes. The braking operation device 8 acts as a so-called parking brake, and a traveling drive unit 52 controls a braking state and a brake releasing state of the braking operation device 8. The braking operation device 8 becomes in the braking state when the dump truck 1 stops, and holds the stopping state of the dump truck 1. On the other hand, the braking operation device 8 becomes in the brake releasing state when the dump truck 1 travels, and allows for a forward travel or backward travel of the dump truck 1.

The engine 9 is provided in the vehicle body 2 to be positioned under the cab 5. The engine 9 is configured by, for example, a large-sized diesel engine. The engine 9 drives a main power generator 10 to generate three-phase AC power, and drives an auxiliary power generator 11 for DC. The auxiliary power generator 11 is connected to a battery 12 as a power source of the traveling drive unit 52, an autonomous mode controller 61 and the like to charge the battery 12. In addition, the engine 9 rotates a hydraulic pump 29 to be described later and the like.

The wheel drive motors 13L and 13R are provided in the vehicle body 2 through an accelerator housing (not shown). The wheel drive motor 13L is connected mechanically to the left rear wheel 7L through a rotational shaft 14 to drive the rear wheel 7L. The wheel drive motor 13R is connected mechanically to the right rear wheel 7R through the rotational shaft 14 to drive the rear wheel 7R. The wheel drive motors 13L, 13R each are configured by a large-sized electric motor, and are driven and rotated by power supplied through a motor control device 41 from the main power generator 10.

The respective wheel drive motors 13L and 13R are controlled by the motor control device 41, and are respectively driven and rotated independently. The motor control device 41, based upon a control signal from the traveling drive unit 52 to be described later, controls rotating speeds of the left and right rear wheels 7L and 7R to be the same as at a straight-ahead traveling time of the vehicle and the rotating speeds of the left and right rear wheels 7L and 7R to be different from each other corresponding to a revolving direction at a revolving time.

Next, an explanation will be made of the configuration of a steering system 21 mounted on the dump truck 1 with reference to FIG. 3 to FIG. 5.

The steering system 21 changes a direction of the front wheels 6L and 6R that are steering wheels in response to an operation of the steering handle 32 of an operator by using a hydraulic force. Here, the steering system 21 is provided with a steering mechanism 22, and a hydraulic circuit 28 for driving the steering cylinders 27L and 27R in the steering mechanism 22.

The steering mechanism 22 includes spindles 23L, 23R, and the steering cylinders 27L and 27R.

The spindles 23L and 23R are respectively attached to a trailing arm (not shown) coupled to the vehicle body 2, and rotatably support the front wheels 6L and 6R. A king pin 24 extending in the upper-lower direction is provided to be integral with the left spindle 23L, and the spindle 23L is supported to be rotatable in the front-rear direction at the center of the king pin 24. A knuckle arm 25L extending backward is provided to be integral with the spindle 23L.

The right spindle 23R is formed to be bilaterally symmetric to the left spindle 23L. Therefore, the king pin 24 extending in the upper-lower direction is provided to be integral with the right spindle 23R as similar to the left spindle 23L, and the spindle 23R is supported to be rotatable in the front-rear direction at the center of the king pin 24. A knuckle arm 25R is provided to be integral with the spindle 23R.

Tip portions of the knuckle arms 25L and 25R are jointed by a tie rod 26. The tie rod 26 and the knuckle arms 25L and 25R form part of a link mechanism. With this link mechanism, the spindles 23L and 23R rotate and are displaced such that the front wheels 6L and 6R are inclined in the same direction to each other in the left-right direction.

The steering cylinders 27L and 27R are configured by hydraulic cylinders that extend/contract by supply/discharge of hydraulic oil from the hydraulic pump 29 to be described later. The left steering cylinder 27L has a base portion attached to a cylinder bracket of the trailing arm, and a tip portion jointed to the midway position of the knuckle arm 25L in the length direction. Similarly, the right steering cylinder 27R has a base portion attached to the cylinder bracket of the trailing arm, and a tip portion jointed to the midway position of the knuckle arm 25R in the length direction.

When one of the steering cylinders 27L and 27R extends, the other thereof contracts. Therefore, the steering cylinders 27L and 27R move the left and right front wheels 6L and 6R in the steering direction to perform a steering operation of the vehicle.

Figure 3:
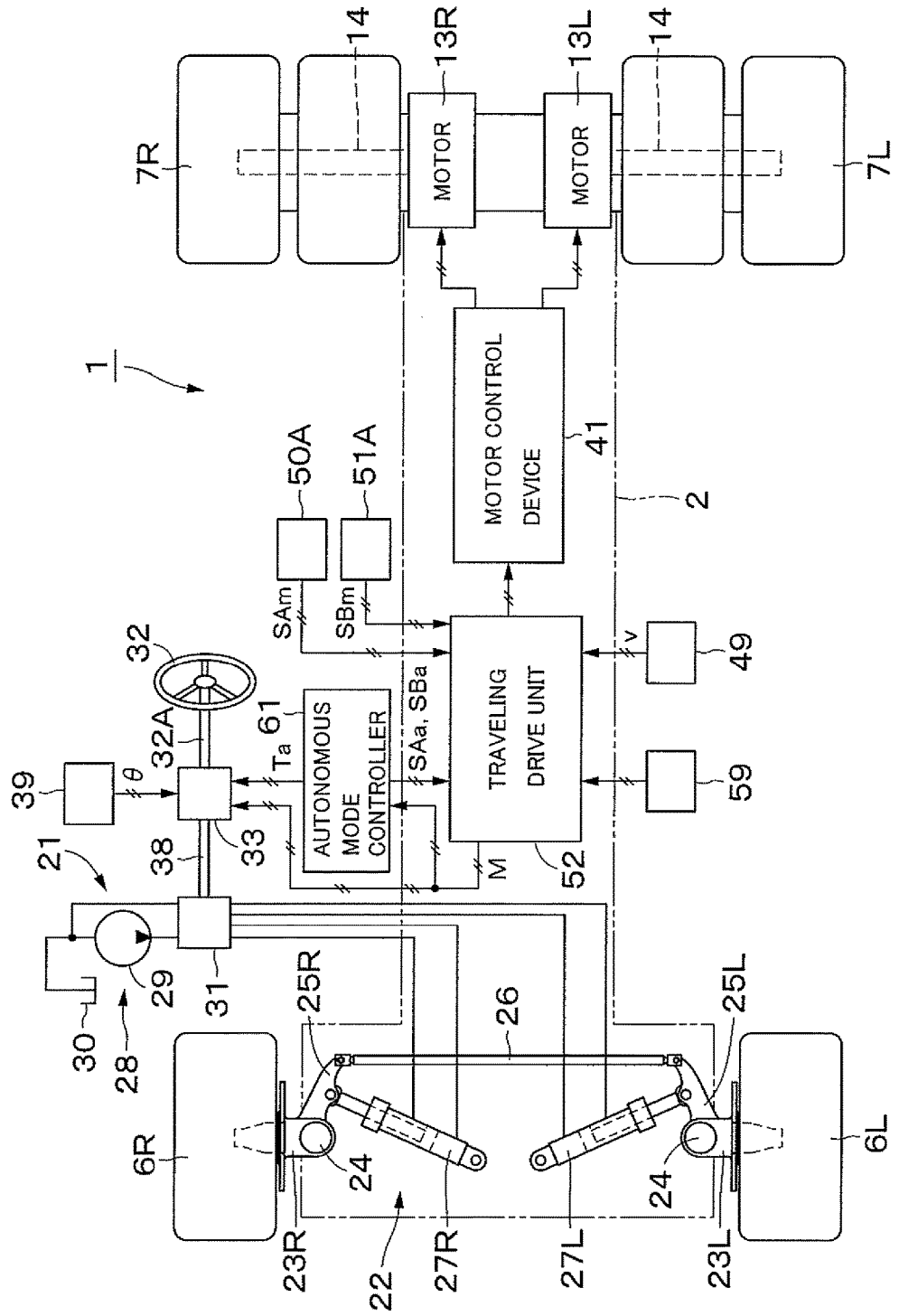
FIG. 3 is an entire configuration diagram showing a steering system and a travel driving system in the dump truck.

As shown in FIG. 3, the hydraulic circuit 28 includes the hydraulic pump 29 and a steering valve 31, and controls supply and discharge of the hydraulic oil to and from the steering cylinders 27L and 27R in response to an operation of the steering handle 32.

The hydraulic pump 29 is provided near the engine 9, and is driven/rotated by the engine 9. The hydraulic pump 29 is connected to a hydraulic oil tank 30 that is attached to a lateral side of the vehicle body 2, and delivers hydraulic oil to the steering cylinders 27L and 27R, and the like.

The steering valve 31 performs switching control of supply and discharge of hydraulic oil to and from the steering cylinders 27L and 27R in response to an operation of the steering handle 32. The steering valve 31 is configured using, for example, a spool valve or the like. The steering valve 31 is jointed to the steering handle 32 through a steering actuator 33, switches supply and discharge of the hydraulic oil corresponding to a rotating direction of the steering handle 32, and controls a flow amount of hydraulic oil corresponding to a rotation angle of the steering handle 32.

The steering handle 32 (steering wheel) is provided in the cab 5, a steering operation of which is performed by an operator. The steering handle 32 configures a steering operation device that operates the traveling direction of a vehicle, and is gripped by the operator to rotate a column shaft 32A to left and right, thus performing a steering operation of the vehicle. It should be noted that the steering operation device is not limited to the steering handle 32 rotated by an operator, but may be configured by a lever operable to be tilted/lifted in the steering direction, for example.

The steering actuator 33 is attached to the column shaft 32A, and configures a power steering device to assist in steering torque Tm acting on the steering handle 32. As shown in FIG. 5, the steering actuator 33 includes a torque sensor 34 that detects the steering torque Tm, a speed reduction mechanism 35, an assist motor 36 composed of an electric motor, and an EPS controller 37 for driving the assist motor 36.

The EPS controller 37 calculates assist torque T0 based upon the steering torque Tm detected by the torque sensor 34, and supplies a drive current for generating the assist torque T0 to the assist motor 36. The assist motor 36 is driven based upon the drive current supplied from the EPS controller 37, and adds the assist torque T0 as additional torque to an output shaft 38 through the speed reduction mechanism 35. As a result, the output shaft 38 is rotated by the combined torque T1 (T1=Tm+T0) by combining the steering torque Tm and the assist torque T0 to perform switch of supply and discharge of hydraulic oil and adjustment of a flow mount of hydraulic oil by the steering valve 31.

A steering angle sensor 39 detects a steering angle θ of the left front wheel 6L, for example. The steering angle sensor 39 is configured by, for example, an electromagnetic pickup rotation angle detector composed of a haul element and a magnet or an optical rotation angle detector composed of a light emitter and an optical receiver.

Here, for example, when the front wheel 6L is directed in a straight-ahead traveling direction of a vehicle, that is, when the front wheel 6L is in a straight-ahead state in parallel to the front-rear direction, the steering angle θ is zero (θ=0 degrees). When the front wheel 6L is inclined in a direction where a vehicle takes a left turn, the steering angle θ becomes a positive value (θ>0 degrees), and when the front wheel 6L is inclined in a direction where a vehicle takes a right turn, the steering angle θ becomes a negative value (θ<0 degrees). Therefore, the steering angle sensor 39 outputs a steering angle signal corresponding to the steering angle θ of the front wheel 6L to the EPS controller 37. It should be noted that the steering angle sensor 39 may detect a steering angle of the right front wheel 6R.

An autonomous mode controller 61 is connected to the EPS controller 37 through an external input terminal 33A of the steering actuator 33, and a torque command Ta is input to the EPS controller 37 from the autonomous mode controller 61 to perform the autonomous steering. In addition thereto, a traveling drive unit 52 is connected to the EPS controller 37, and a mode signal M indicating a mode selected out of the manual mode and the autonomous mode is input to the EPS controller 37 from the traveling drive unit 52.

When the manual mode is selected by the mode signal M, the EPS controller 37 makes the torque command Ta from the autonomous mode controller 61 invalid. Then, the EPS controller 37 calculates assist torque T0 based upon the steering torque Tm detected by the torque sensor 34, and supplies a drive current to the assist motor 36 to generate the assist torque T0.

On the other hand, when the autonomous mode is selected by the mode signal M, the EPS controller 37 makes the torque command Ta from the autonomous mode controller 61 valid. Then, the EPS controller 37 calculates assist torque T0 based upon the torque command Ta from the autonomous mode controller 61 and a steering angle θ by the steering angle sensor 39, and supplies a drive current to the assist motor 36 to generate the assist torque T0.

Next, an explanation will be made of an electric system for travel and drive mounted on the dump truck 1 with reference to FIG. 4, FIG. 6 and FIG. 7.

The motor control device 41 controls the traveling drive unit 52 to be described later, and a power running operation and a regeneration operation of the wheel drive motors 13L, 13R. The motor control device 41 is positioned in the lateral side of the cab 5, and is configured by a power distribution switchboard provided to rise on a deck portion 2A of the vehicle body 2, and the like. As shown in FIG. 6, the motor control device 41 includes a converter 42 and inverters 44.

The converter 42 is configured by using a rectifier cell such as diode and thyristor, and includes a rectifier 42A that performs full-wave rectification of AC power and a smoothing capacitor 42B connected to the latter stage of the rectifier 42A to smooth the power waveform. The converter 42 is connected to the output side of the main power generator 10 to convert three-phase AC power of U phase, V phase and W phase output from the main power generator 10 into DC power of P phase and N phase. Therefore, the converter 42 configures a DC power source together with the main power generator 10. The converter 42 is connected to the inverters 44 by using a pair of DC buses 43A, 43B.

The inverter 44 is configured by using a plurality of switching elements (not shown) using, for example, a transistor, a thyristor or an insulating gate bipolar transistor (IGBT). The inverters 44 are respectively connected to the wheel drive motors 13L, 13R, and operate based upon control signals from the traveling drive unit 52.

At the traveling of the dump truck 1, the inverters 44 convert the DC power into three-phase AC power of a variable frequency to perform the power running operations of the wheel drive motors 13L, 13R. Therefore, the inverter 44 controls an on/off operation of the switching element, and thereby, converts the DC power output from the converter 42 into the three-phase AC power of U phase, V phase and W phase and supplies this three-phase AC power to the wheel drive motors 13L, 13R.

On the other hand, at the decelerating of the dump truck 1, the inverters 44 convert three-phase AC power into DC power to perform the regeneration of the wheel drive motors 13L, 13R. Therefore, the inverter 44 controls an on/off operation of the switching element, and thereby, converts an electromotive force of the three-phase AC power regenerated in the wheel drive motors 13L, 13R into DC power, and outputs this DC power to resistors 45.

The resistors 45 are connected to the DC buses 43A, 43B between the converter 42 and the inverters 44. The resistors 45 are respectively disposed in grid boxes 46 in an angular cylindrical shape, and generate heat in response to the DC power supplied from the inverters 44, and consumes the electromotive force regenerated in the wheel drive motors 13L, 13R.

As shown in FIG. 2, the grid boxes 46 are positioned at the opposite side to the cab 5 at the center of the motor control device 41 in the left-right direction, and are provided to be stacked on the deck portion 2A of the vehicle body 2. The resistors 45 are respectively accommodated in the plurality of grid boxes 46, and the plurality of resistors 45 are connected to the DC buses 43A, 43B in parallel to each other.

As shown in FIG. 6, a chopper 47 is provided between the resistor 45 and the DC buses 43A, 43B. The chopper 47 is configured by using a switching element of various types using a semiconductor, for example. At the decelerating of the dump truck 1, the chopper 47 reduces the DC voltage applied to the DC buses 43A, 43B to a predetermined voltage value or less. That is, the chopper 47 controls an on/off operation of the switching element, and thereby, reduces the regeneration power by the wheel drive motors 13L, 13R to a predetermined voltage value or less, which is supplied to the resistor 45. As a result, a current flows in the resistor 45, and the resistor 45 converts electrical energy into thermal energy. On the other hand, at the traveling of the dump truck 1, the chopper 47 becomes in a disconnection state to electrically block off connection between the DC buses 43A, 43B and the resistor 45. It should be noted that a switch for switching the connection and disconnection may be provided between the resistor 45 and the DC buses 43A, 43B instead of the chopper 47.

Blowers 48 are mounted to the grid boxes 46. The blower 48 is configured by an electric motor that is driven by power supply from the DC buses 43A, 43B, for example. The blower 48 is driven, for example, in response to a heat generator operation of the resistor 45 to supply cooling air toward the resistor 45.

A wheel speed sensor 49 is disposed, for example, near the rotational shaft 14, detects a rotational speed of the rotational shaft 14 of the wheel drive motors 13L, 13R, and calculates a wheel speed v as a rotational speed of the rear wheels 7L, 7R based upon this rotational speed. That is, rotation of the rotational shaft 14 in a predetermined reduction ratio predetermined by a multi-step planetary reduction mechanism (for example, a reduction ratio of approximately 30 to 40) to the rotational speed of the wheel drive motors 13L, 13R is transmitted to the rear wheels 7L, 7R. Therefore, the wheel speed sensor 49 detects the rotational speed of the rotational shaft 14 to calculate a wheel speed v (traveling speed of the vehicle) of the rear wheels 7L, 7R based upon a reduction ratio of the speed reduction mechanism or the like. An output side of the wheel speed sensor 49 is connected to the traveling drive unit 52.

The accelerator pedal 50 forms an acceleration operation device that operates acceleration of the vehicle. The accelerator pedal 50 is provided in the cab 5, and is operated to be depressed by an operator. The wheel drive motors 13L, 13R perform a power running operation corresponding to a depressing amount of the accelerator pedal 50 to accelerate the dump truck 1. The accelerator pedal 50 is provided with an accelerator operation sensor 50A that detects the operation amount. The accelerator operation sensor 50A is configured by, for example, an angular sensor, a potentiometer or the like, and outputs an acceleration command SAm corresponding to an operation amount (depressing amount) of the accelerator pedal 50. It should be noted that the acceleration operation device is not limited to the accelerator pedal 50 that is depressed by an operator, and may be configured by a lever that is manually operated or the like.

The brake pedal 51 forms a braking operation device that operates a brake of the vehicle. The brake pedal 51 is disposed in the cab 5 and is operated to be depressed by an operator. The wheel drive motors 13L, 13R are regenerated corresponding to an operation amount of the brake pedal 51 to decelerate the dump truck 1. The brake pedal 51 is provided with a braking operation sensor 51A that detects an operation amount thereof. The braking operation sensor 51A is configured by, for example, an angular sensor, a potentiometer or the like, and outputs a braking command SBm corresponding to an operation amount (depressing amount) of the brake pedal 51. It should be noted that the braking operation device is not limited to the brake pedal 51 that is depressed by an operator, and may be configured by a lever that is manually operated or the like.

An outside side of each of the accelerator operation sensor 50A and the braking operation sensor 51A is connected to the traveling drive unit 52 to be described later. The traveling drive unit 52 determines whether the dump truck 1 is in an acceleration or deceleration state based upon the acceleration command SAm from the accelerator operation sensor 50A and the braking command SBm from the braking operation sensor 51A.

The traveling drive unit 52 is configured by, for example, a microcomputer and the like, and is a control device that causes the vehicle to travel based upon the acceleration command SAm from the accelerator pedal 50 and the braking command SBm from the brake pedal 51. The traveling drive unit 52 is connected to the motor control device 41 and the like, outputs a control signal according to a travel state of the dump truck 1 and the like, and controls to switch the switching elements in the inverters 44 by this control signal. Specifically, at the accelerating of the dump truck 1, the traveling drive unit 52 controls the switching elements in the inverters 44 in such a way as to convert the DC power from the main power generator 10 into three-phase AC power. On the other hand, at the decelerating of the dump truck 1, the traveling drive unit 52 controls the switching elements in the inverters 44 in such a way as to convert the electromotive power composed of three-phase AC power generated in the wheel drive motors 13L, 13R into DC power.

Further, the traveling drive unit 52 is connected to each of the chopper 47 and the blower 48, switches connection/disconnection between the resistor 45 and the DC buses 43A, 43B and switches drive and stop of the blower 48. Specifically, at the accelerating of the dump truck 1, the traveling drive unit 52 controls the chopper 47 to be in a stop state to block off an electrical connection between the resistor 45 and the DC buses 43A, 43B. Thereby, the traveling drive unit 52 stops power consumption by the resistor 45 and stops the blower 48.

On the other hand, at the decelerating of the dump truck 1, the traveling drive unit 52 controls the chopper 47 to be in a drive state to establish an electrical connection between the resistor 45 and the DC buses 43A, 43B. Thereby, the traveling drive unit 52 allows for power consumption by the resistor 45 and drives the blower 48 to supply cooling air toward the resistor 45.

The accelerator operation sensor 50A and the braking operation sensor 51A are connected to the traveling drive unit 52, and the acceleration command SAm from the accelerator operation sensor 50A and the braking command SBm from the braking operation sensor 51A are input to the traveling drive unit 52. In addition, the autonomous mode controller 61 is connected to the traveling drive unit 52 through the external input terminals 52A, 52B. The acceleration command SAa from the autonomous mode controller 61 is input to the traveling drive unit 52 through the external input terminal 52A, and the braking command SBa from the autonomous mode controller 61 is input to the traveling drive unit 52 through the external input terminal 52B. Further, a mode selecting switch 59 that selects one of the manual mode and the autonomous mode is connected to the traveling drive unit 52.

When the manual mode is selected by the mode selecting switch 59, the traveling drive unit 52 calculates an acceleration command SA based upon the acceleration command SAm from the accelerator operation sensor 50A and calculates a braking command SB based upon the braking command SBm from the braking operation sensor 51A. The traveling drive unit 52 controls the motor control device 41 based upon the acceleration command SA and the braking command SB.

On the other hand, when the autonomous mode is selected by the mode selecting switch 59, the traveling drive unit 52 calculates an acceleration command SA based upon the acceleration command SAa from the autonomous mode controller 61 and calculates a braking command SB based upon the braking command SBa from the autonomous mode controller 61. The traveling drive unit 52 controls the motor control device 41 based upon the acceleration command SA and the braking command SB.

Figure 7:
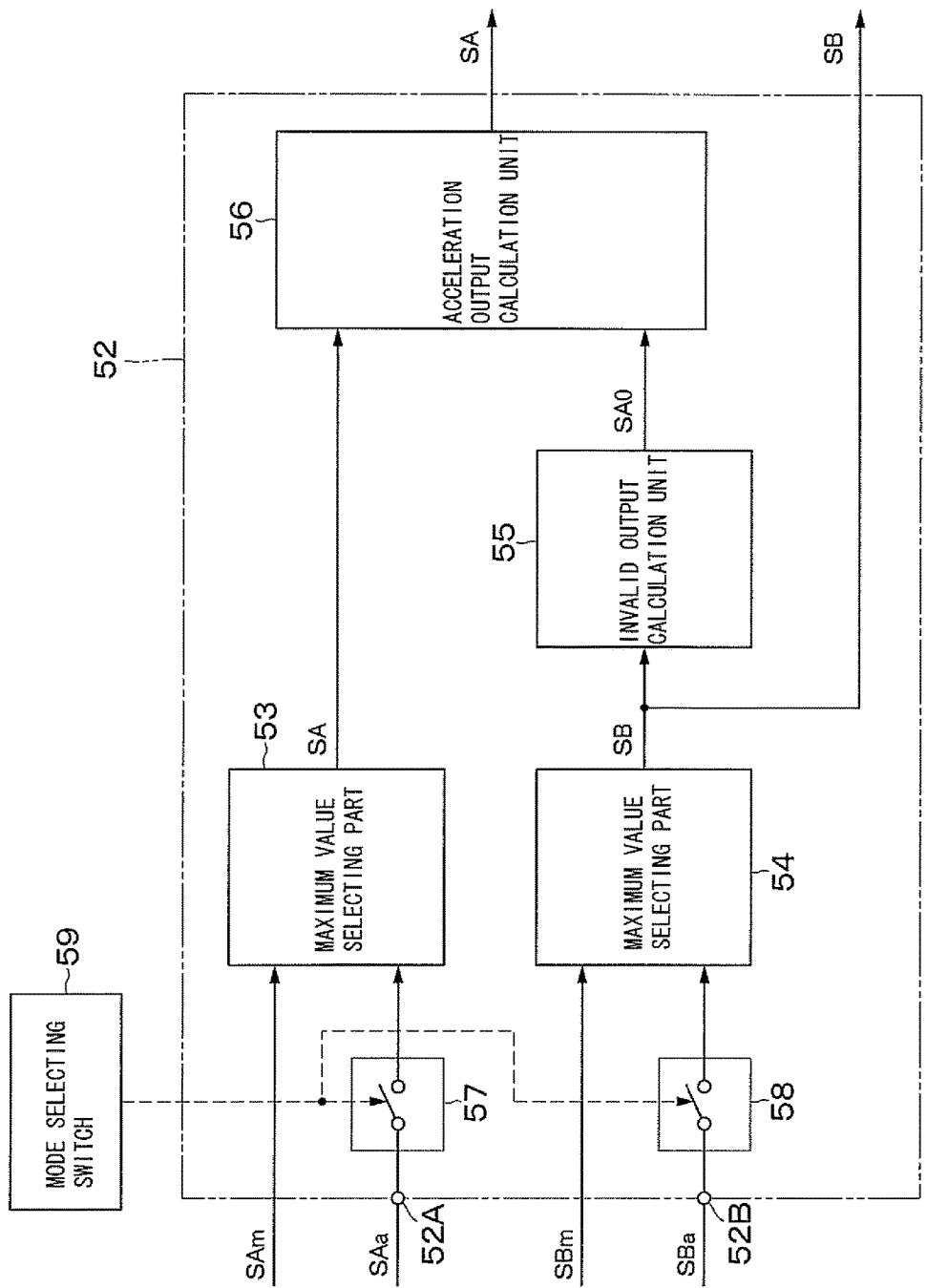
FIG. 7 is a block diagram showing a traveling drive unit in FIG. 6.

As shown in FIG. 7, the traveling drive unit 52 is provided with maximum value selecting parts 53, 54, an invalid output calculation unit 55, an acceleration output calculation unit 56 and autonomous mode invalid switches 57, 58.

The acceleration command SAm from the accelerator operation sensor 50A and the acceleration command SAa from the autonomous mode controller 61 are input to the maximum value selecting part 53. The maximum value selecting part 53 forms an acceleration command selecting part, selects a larger one of the acceleration command SAm and the acceleration command SAa, and outputs the selected acceleration command SA. At this time, the larger value of the acceleration command SAm and the acceleration command SAa is a command for generating a large rate of acceleration (traveling drive force).

The braking command SBm from the braking operation sensor 51A and the braking command SBa from the autonomous mode controller 61 are input to the maximum value selecting part 54. The maximum value selecting part 54 forms a deceleration command selecting part, selects a larger one of the braking command SBm and the braking command SBa, and outputs the selected braking command SB. At this time, the larger value of the braking command SBm and the braking command SBa is a command for generating a large rate of deceleration (braking force).

The braking command SB selected from the maximum value selecting part 54 is input to the invalid output calculation unit 55. The invalid output calculation unit 55 prioritizes the braking command SB over the acceleration command SA, and therefore, outputs an invalid acceleration command SA0 to make the acceleration command SA invalid. Specifically, when the braking command SB is a value larger than a predetermined value, the invalid output calculation unit 55 outputs the invalid acceleration command SA0 to make the acceleration zero. On the other hand, when the braking command SB is a value smaller than a predetermined value, the invalid output calculation unit 55 stops the output of the invalid acceleration command SA0.

The acceleration output calculation unit 56 calculates a final acceleration command SA based upon the acceleration command SA output from the maximum value selecting part 53 and the invalid acceleration command SA0. Specifically, when the invalid acceleration command SA0 is output, the acceleration output calculation unit 56 prioritizes the invalid acceleration command SA0 over the acceleration command SA, and therefore, stops the output of the acceleration command SA to make the acceleration zero. On the other hand, when the invalid acceleration command SA0 is not output, the acceleration output calculation unit 56 outputs the acceleration command SA output from the maximum value selecting part 53 as it is.

The autonomous mode invalid switches 57, 58 switch validity and invalidity of the commands SAa, SBa input from the autonomous mode controller 61 corresponding to a mode selected by the mode selecting switch 59. That is, when the autonomous mode is selected by the mode selecting switch 59, the autonomous mode invalid switches 57, 58 make the acceleration command SAa and the braking command SBa valid, and input the commands SAa, SBa to the maximum value selecting parts 53, 54.

On the other hand, when the manual mode is selected by the mode selecting switch 59, the autonomous mode invalid switches 57, 58 make the acceleration command SAa and the braking command SBa invalid. At this time, the acceleration command SAa and the braking command SBa are not input to the maximum value selecting parts 53, 54. Therefore, the maximum value selecting part 53 selects the acceleration command SAm based upon the manual operation, which will be output as an acceleration command SA. Likewise, the maximum value selecting part 54 selects the braking command SBm based upon the manual operation, which will be output as a braking command SB.

The traveling drive unit 52 calculates travel torque, which is made to be generated in the wheel drive motors 13L, 13R, based upon the acceleration command SA and the braking command SB, and the wheel speed v from the wheel speed sensor 49. In addition, the traveling drive unit 52 controls the motor control device 41 to drive in the travel torque calculated by the wheel drive motors 13L, 13R.

Next, an explanation will be made of the autonomous mode controller 61 for autonomous travel of the dump truck 1 with reference to FIG. 4 and FIG. 8.

Figure 4:
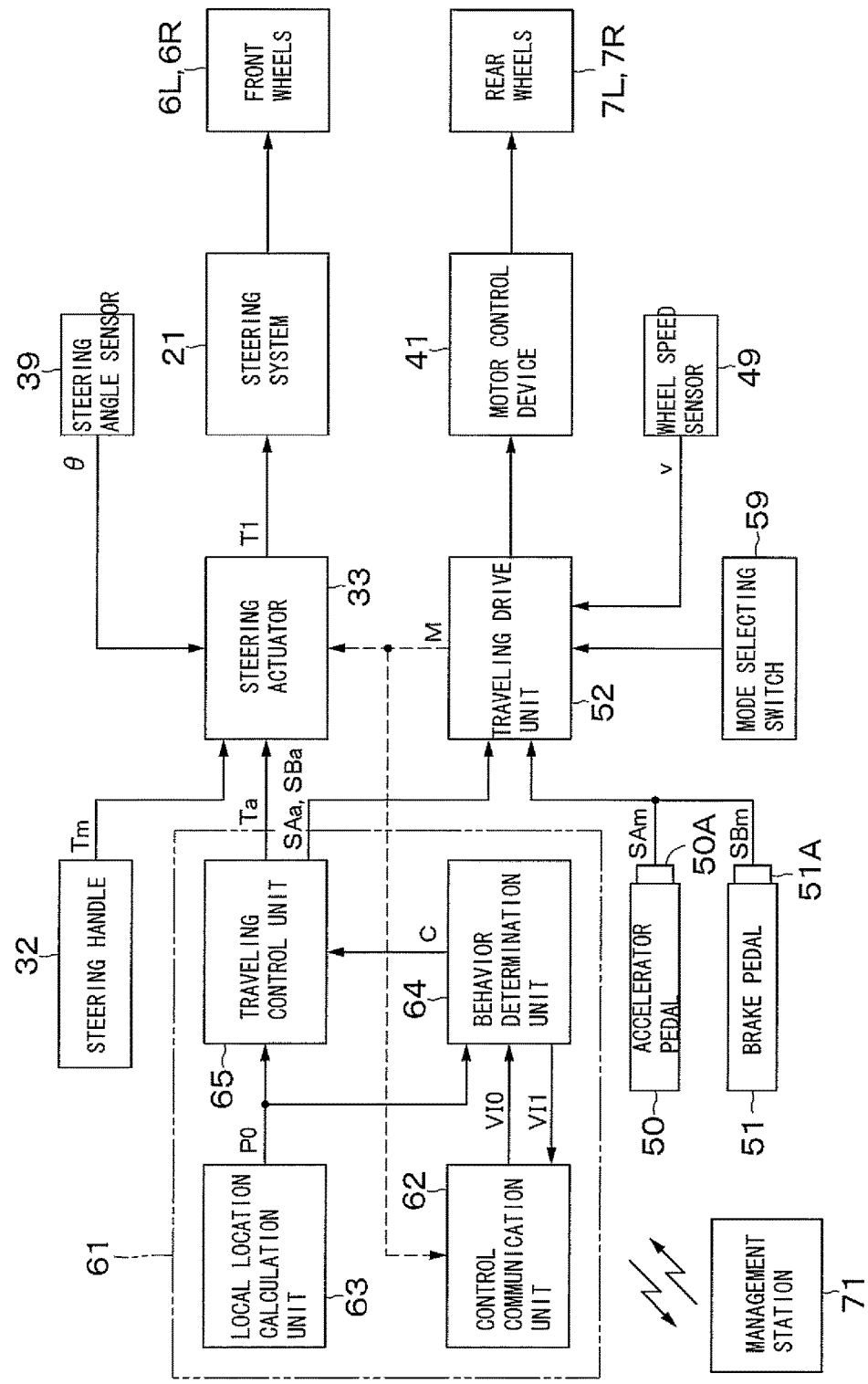
FIG. 4 is a block diagram showing an entire configuration of the dump truck.

As shown in FIG. 4, the autonomous mode controller 61 is provided with a control communication unit 62, a local location calculation unit 63, a behavior determination unit 64 and a travel control unit 65.

The control communication unit 62 performs mutual communication with an external management station 71. The control communication unit 62 receives various kinds of operation commands V10 including information of the other vehicle, such as a traveling state or vehicle position of the other dump truck, for example, from the management station 71. The control communication unit 62 outputs the operation command V10 to the behavior determination unit 64.

In addition, a mode signal M is input to the control communication unit 62 from the traveling drive unit 52, and local-vehicle information V11, such as a traveling state and vehicle position P0 of the dump truck 1, is input to the control communication unit 62 from the behavior determination unit 64. The control communication unit 62 determines the selected mode of the manual mode and the autonomous mode by the mode signal, and transmits the selected mode and the local-vehicle information V11 to the management station 71. Thereby, the management station 71 can recognize whether the dump truck 1 operates in the manual mode or in the autonomous mode. In addition thereto, the management station 71 can recognize in whose state of the traveling state and the stopping state the dump truck 1 is. Therefore, the management station 71 can output an operation command V10 corresponding to these conditions.

The local location calculation unit 63 forms a vehicle location calculation unit that calculates a vehicle position P0 of a local vehicle. Specifically, the local location calculation unit 63 is connected to, for example, a GPS antenna (not shown), and calculates a vehicle position P0 based upon a signal transmitted from a GPS satellite. Further, the local location calculation unit 63 may be configured to be connected to the wheel speed sensor 49 and a gyroscope (not shown) provided in the dump truck 1, for example. In this case, the local location calculation unit 63 refers to map information of a working site including a loading area LA and a haul road HR, and the like, and calculates a vehicle position based upon an output signal of the wheel speed sensor 49 and an output signal of the gyroscope. It should be noted that the local location calculation unit 63 may calculate a vehicle position P0 by combining the position information based upon the GPS and the position information based upon the wheel speed sensor 49 and the like.

The behavior determination unit 64 determines a traveling operation of the dump truck 1 in the autonomous mode. Specifically, the behavior determination unit 64 determines an operation of the dump truck 1 during the autonomous mode based upon the vehicle position P0 calculated by the local location calculation unit 63 and the operation command V10 received by the control communication unit 62, and outputs an operation command C including a target vehicle speed corresponding to the determined operation to a traveling control unit 65. In addition, the behavior determination unit 64 outputs the local-vehicle information V11 based upon a traveling state and a vehicle position P0 of the dump truck 1 corresponding to the operation command C to the control communication unit 62.

The operations that will be determined by the behavior determination unit 64 include operations as follows. As shown in FIG. 8, when the dump truck 1 is on the haul road HR, the behavior determination unit 64 performs, for example, an operation of advancing from the haul road HR into the loading area LA or an operation of retreating from the loading area LA into the haul road HR. In addition, when the dump truck 1 is within the loading area LA, the behavior determination unit 64 performs any of, for example, a queuing operation, an approaching operation and a haul operation within the loading area LA.

Here, the queuing operation is an operation that the dump truck 1 having advanced from the haul road HR into the loading area LA moves to a turnaround point TP. The approaching operation is an operation that the dump truck 1 retreats from the turnaround point TP and moves to an approaching position AP. The haul operation is an operation that the dump truck 1 moves from the approaching position AP to the haul road HR.

The traveling control unit 65 forms a traveling trajectory trace unit (TRJ) that calculates an acceleration command SAa, a braking command SBa and a torque command Ta based upon a vehicle position P0 calculated by the local location calculation unit 63 and a predetermined travel trajectory. The traveling control unit 65 controls the steering actuator 33, the engine 9 and the motor control device 41 in the dump truck 1 based upon the operation command C from the behavior determination unit 64 and the vehicle position P0 calculated by the local location calculation unit 63, and performs an operation determined by the behavior determination unit 64. As shown in FIG. 4, the traveling control unit 65 calculates a steering torque command Ta, an acceleration command SAa and a braking command SBa based upon the operation command C and the vehicle position P0 for the output.

Specifically, the traveling control unit 65 calculates a steering direction of the vehicle based upon the operation command C and the vehicle position P0 such that the dump truck 1 travels according to a predetermined travel trajectory. The traveling control unit 65 outputs the torque command Ta corresponding to the calculated steering direction to the steering actuator 33. Thereby, since the assist motor 36 in the steering actuator 33 is rotated in accordance with the torque command Ta, the output shaft 38 and the steering valve 31 are driven to control a steering angle θ of the front wheels 6L, 6R.

In addition, the traveling control unit 65 calculates a rate of acceleration and a rate of deceleration of the vehicle based upon the operation command C and the vehicle position P0 such that the dump truck 1 travels according to the predetermined travel trajectory. The traveling control unit 65 outputs an acceleration command SAa corresponding to the calculated rate of acceleration and a braking command SBa corresponding to the calculated rate of deceleration to the traveling drive unit 52. Thereby, the traveling drive unit 52 controls the motor control device 41 based upon the acceleration command SAa and the braking command SBa to control acceleration and deceleration of the rear wheels 7L, 7R.

The dump truck 1 according to the embodiment has the configuration as described above, and next, an operation thereof will be explained.

Figure 8:
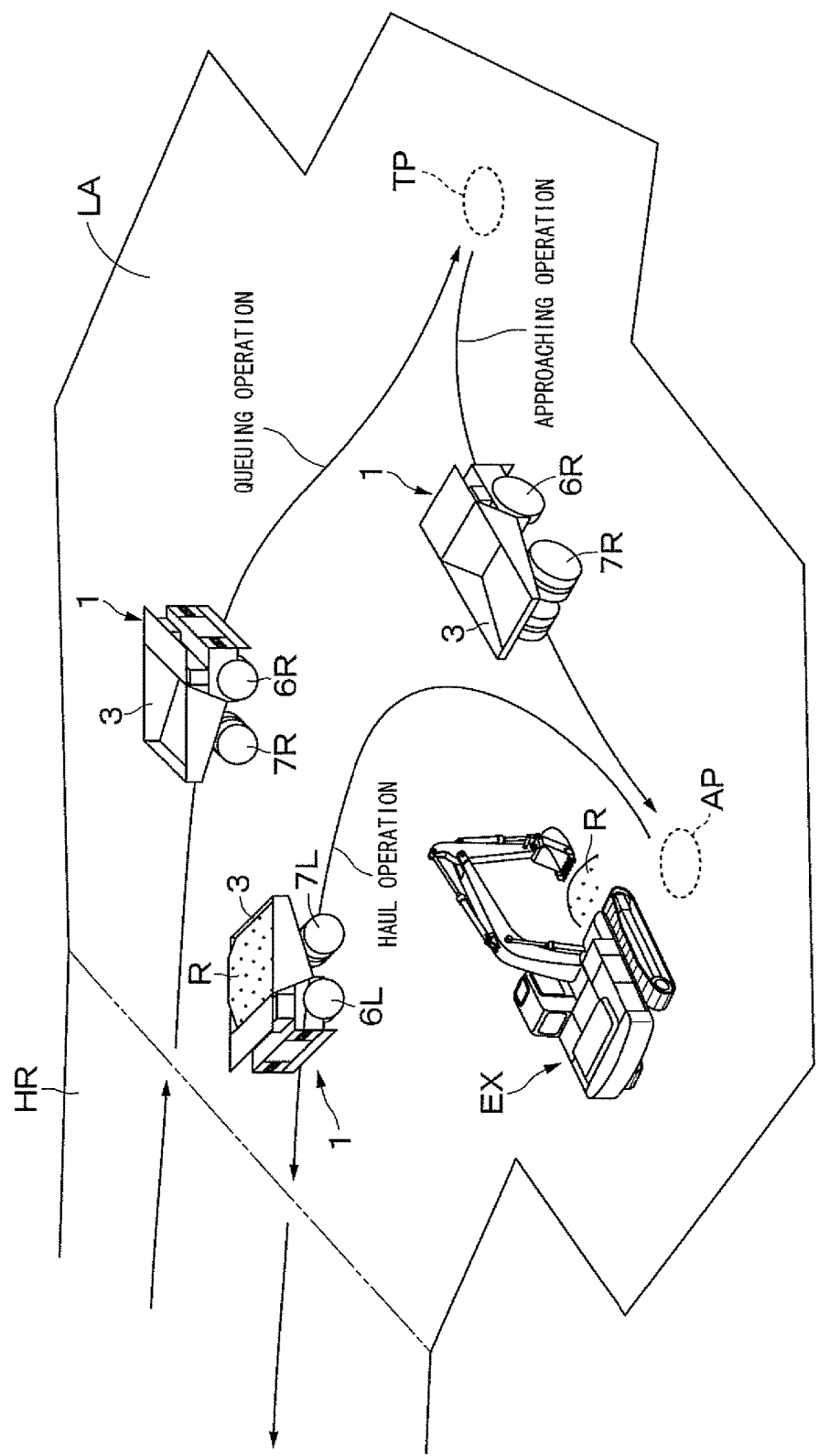
FIG. 8 is an explanatory diagram showing a state where the dump truck travels on a haul road and within a loading area.

As shown in FIG. 8, a mine such as a quarry site is provided with the loading area LA and the haul road HR. Here, the loading area LA is a place where transporting objects R such as crushed stones, earth and sand are loaded on the dump truck 1 by a hydraulic excavator EX. In this loading area LA, an excavating work for excavating crushed stones and the like by the hydraulic excavator EX together with the loading work of transporting objects R onto the dump truck 1 are performed. Here, the hydraulic excavator EX moves within the loading area LA following progress of the loading work or the excavating work. Therefore, the loading area LA is a place where a movement trajectory of the dump truck 1 changes following the movement of the hydraulic excavator EX.

The haul road HR is an improved path, and is provided to be connected to the loading area LA. The dump truck 1 advances into the loading area LA from an exterior through the haul road HR in an emptied state. The dump truck 1 retreats from the loading area LA through the haul road HR in a state where the transporting objects R are loaded, and take out the transporting object R to an external dumping area (not shown). As long as, for example, obstacles and the like do not exist on the haul road HR, the dump truck 1 travels on the haul road HR according to a predetermined, given movement trajectory. Therefore, the haul road HR is a place where the movement trajectory of the dump truck 1 becomes substantially constant.

The dump truck 1 has the manual mode of traveling in response to the manual operation of an operator and the autonomous mode of traveling according to the operation command V10 from the management station 71. Therefore, an explanation will be first made of a traveling operation of the dump truck 1 in the manual mode.

Figure 5:
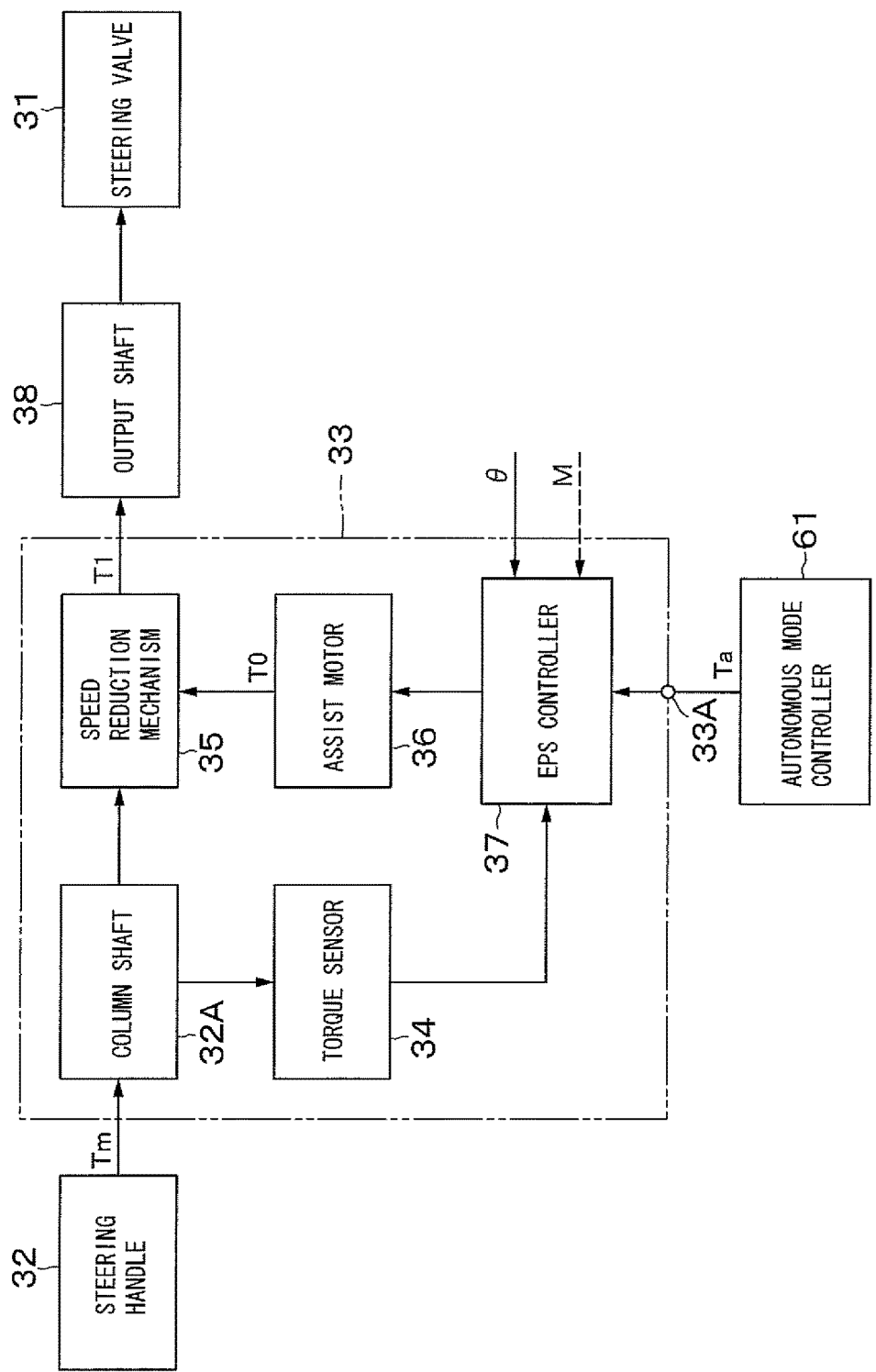
FIG. 5 is a block diagram showing a steering actuator in FIG. 4.

As shown in FIG. 3 to FIG. 5, when an operator rotates the steering handle 32 in the manual mode, the steering actuator 33 generates steering torque Tm by the operator, and further, assist torque T0 corresponding to the steering torque Tm, and rotates the output shaft 38 by combined torque T1 found by combining them. The steering valve 31 performs switch of supply and discharge of hydraulic oil and adjustment of a flow amount of hydraulic oil in response to rotation of the output shaft 38. Thereby, the steering cylinders 27L, 27R are driven to adjust a steering angle θ of the front wheels 6R, 6L.

Further, as shown in FIG. 4, FIG. 6 and FIG. 7, when an operator performs a depressing operation of the accelerator pedal 50, the accelerator operation sensor 50A outputs an acceleration command SAm corresponding to an operation amount (depressing amount) of the accelerator pedal 50 to the traveling drive unit 52. Likewise, when an operator performs a depressing operation of the brake pedal 51, the braking operation sensor 51A outputs a braking command SBm corresponding to an operation amount (depressing amount) of the brake pedal 51 to the traveling drive unit 52.

The traveling drive unit 52 calculates an acceleration command SA based upon the acceleration command SAm, and calculates a braking command SB based upon the braking command SBm. The traveling drive unit 52 controls the motor control device 41 based upon the acceleration command SA and the braking command SB. The motor control device 41 performs a power running operation or a regeneration operation of the wheel drive motors 13L, 13R based upon the acceleration command SA and the braking command SB to control a traveling drive of the rear wheels 7L, 7R.

Thereby, the dump truck 1 travels on the haul road HR or on the loading area LA based upon an operation of the steering handle 32, an operation of the accelerator pedal 50 and an operation of the brake pedal 51 by an operator.

Next, an explanation will be made of the traveling operation of the dump truck 1 in the autonomous mode.

When the mode selecting switch 59 of the dump truck 1 is switched, the dump truck 1 is switched from the manual mode to the autonomous mode. As shown in FIG. 4, in the autonomous mode, the autonomous mode controller 61 outputs a torque command Ta for steering to the steering actuator 33, and outputs an acceleration command SAa for accelerating the vehicle and a braking command SBa for decelerating the vehicle to the traveling drive unit 52.

As shown in FIG. 5, the steering actuator 33 drives the assist motor 36 based upon the torque command Ta from the autonomous mode controller 61, and rotates the output shaft 38 by the assist torque T0 in response to the torque command Ta. The steering valve 31 performs switch of supply and discharge of hydraulic oil and adjustment of a flow amount of hydraulic oil in response to rotation of the output shaft 38. Thereby, the steering cylinders 27L, 27R are driven to adjust a steering angle θ of the front wheels 6R, 6L.

As shown in FIG. 6 and FIG. 7, the traveling drive unit 52 calculates an acceleration command SA based upon the acceleration command SAa from the autonomous mode controller 61, and calculates a braking command SB based upon the braking command SBa from the autonomous mode controller 61. The traveling drive unit 52 controls the motor control device 41 based upon the acceleration command SA and the braking command SB. The motor control device 41 performs a power running operation or a regeneration operation of the wheel drive motors 13L, 13R based upon the acceleration command SA and the braking command SB to control a traveling drive of the rear wheels 7L, 7R.

Thereby, the dump truck 1 travels autonomously on the haul road HR or on the loading area LA based upon the torque command Ta, the acceleration command SAa and the braking command SBa from the autonomous mode controller 61.

Here, when the dump truck 1 moves toward the loading area LA in a state where an operator gets in the dump truck 1, in some cases the dump truck 1 travels in the autonomous mode. In this state, the operator who has got in the dump truck 1 possibly desires to stop the dump truck 1.

At this time, according to the conventional art, the machine control module in common between the autonomous mode and the manual mode is used, and in the autonomous mode, the manual operation is made invalid. Therefore, for stopping the dump truck 1 in the autonomous mode, it is necessary to perform a braking operation after switching from the autonomous mode to the manual mode, thus it causes a problem of difficulty of performing a quick stopping operation.

In contrast to this, in the dump truck 1 according to the present embodiment, the maximum value selecting part 53 in the traveling drive unit 52 compares the acceleration command SAm by the accelerator pedal 50 and the acceleration command SAa by the autonomous mode controller 61 to select a larger one thereof. Likewise, the maximum value selecting part 54 in the traveling drive unit 52 compares the braking command SBm by the brake pedal 51 and the braking command SBa by the autonomous mode controller 61 to select a larger one thereof, which is output as the braking command SB. In addition thereto, the accelerator output calculation unit 56 in the traveling drive unit 52 prioritizes the braking command SB selected by the maximum value selecting part 54 over the acceleration command SA selected by the maximum value selecting part 53 to make the acceleration command SA invalid.

Therefore, at the time of traveling in the autonomous mode, when an operator depresses the brake pedal 51, since the braking command SBm by the brake pedal 51 exceeds the braking command SBa by the autonomous mode controller 61, the traveling drive unit 52 outputs the braking command SB corresponding to the depressing amount of the brake pedal 51. Therefore, it is possible to stop the dump truck 1 during the autonomous mode by the depressing operation of the brake pedal 51 without switching from the autonomous mode to the manual mode.

In addition, even when the dump truck 1 travels in the autonomous mode, as an operator rotates the steering handle 32, it is possible to apply the steering torque Tm following this rotation to the output shaft 38. Therefore, the steering system 21 can be controlled with the rotational operation of the steering handle 32 by the operator without switching from the autonomous mode to the manual mode, and it is possible to adjust the traveling direction of the dump truck 1 during the autonomous mode with the rotational operation of the steering handle 32. Further, the depressing operation of the accelerator pedal 50 enables the dump truck 1 during the autonomous mode to be accelerated.

Thus, according to the present embodiment, the maximum value selecting part 53 (acceleration command selecting part) in the traveling drive unit 52 selects a larger one of the acceleration command SAa input from the external input terminal 52A and the acceleration command SAm by the accelerator pedal 50 (acceleration operation device) as an acceleration command SA, and the maximum value selecting part 54 in the traveling drive unit 52 selects a larger one of the braking command SBa input from the external input terminal 52B and the braking command SBm by the brake pedal 51 (braking operation device) as a braking command SB. Therefore, the traveling drive unit 52 can accelerate or decelerate the vehicle based upon the acceleration command SA selected by the maximum value selecting part 53 and the braking command SB selected by the maximum value selecting part 54.

In addition, the maximum value selecting part 54 selects a larger one of the braking command SBa input from the external input terminal 52B and the braking command SBm by the brake pedal 51 as the braking command SB. Therefore, for example, even during the autonomous traveling, operating the brake pedal 51 by an operator having got in the vehicle enables the maximum value selecting part 54 to select the braking command SBm by the brake pedal 51. As a result, it is possible to stop the vehicle by performing the manual operation of the brake pedal 51 even during the autonomous travel.

Further, since the traveling drive unit 52 is provided with the external input terminals 52A, 52B, it is possible to add a function of the autonomous mode by inputting the acceleration command SAa and the braking command SBa for autonomous travel to the external input terminals 52A, 52B. That is, connecting the autonomous mode controller 61 to the external input terminals 52A, 52B in the traveling drive unit 52 enables the dump truck 1 capable of traveling in the autonomous mode to be configured. Therefore, components other than the autonomous mode controller 61 can be used in common between a vehicle for manual mode and a vehicle for autonomous mode to reduce the manufacturing costs.

In addition, the dump truck 1 is provided with the steering handle 32 (steering operation device) that operates a traveling direction of a vehicle, the steering actuator 33 that adds the assist torque T0 (additional torque) to the steering torque Tm of the steering handle 32, and further, the steering system 21 that steers a vehicle based upon combined torque T1 by combining the steering torque Tm and the assist torque T0. Besides, the steering actuator 33 generates assist torque T0 (additional torque) based upon a torque command Ta from an exterior. At this time, the steering system 21 steers a vehicle based upon the combined torque T1 by combining the steering torque Tm and the assist torque T0. Therefore, by inputting the torque command Ta for autonomous travel to the steering actuator 33, it is possible to generate the assist torque T0 based upon the torque command Ta in the steering actuator 33 and steer a vehicle based upon the assist torque T0. In addition, it is possible to perform the steering by the manual operation by inputting steering torque Tm larger than the assist torque T0 from the steering handle 32 even during the autonomous travel.

Further, since the steering actuator 33 is a power steering device, the power steering device can generate assist torque T0 for assisting in the steering torque Tm at the time of performing the manual operation. On the other hand, at the time of performing the autonomous travel, by inputting a torque command Ta from an exterior to the steering actuator 33, the steering actuator 33 can generate assist torque T0 based upon the torque command Ta.

In addition, the autonomous mode controller 61 causing a vehicle to travel according to a predetermined travel trajectory is connected to the external input terminals 52A, 52B in the traveling drive unit 52 and the steering actuator 33. In addition thereto, the autonomous mode controller 61 is provided with the local location calculation unit 63 (vehicle location calculation unit) that calculates a position of a vehicle, and the traveling control unit 65 (traveling trajectory trace unit) that calculates an acceleration command SAa, a braking command SBa and a torque command Ta based upon a vehicle position P0 calculated by the local location calculation unit 63 and a predetermined travel trajectory. Therefore, a vehicle can autonomously travel according to the predetermined travel trajectory by connecting the autonomous mode controller 61 to the external input terminals 52A, 52B in the traveling drive unit 52 and the steering actuator 33.

The mode selecting switch 59 is connected to the traveling drive unit 52. Therefore, the mode selecting switch 59 allows for input of the acceleration command SAa and the braking command SBa, whereby the traveling drive unit 52 can control a traveling drive of a vehicle based upon the acceleration command SAa and the braking command SBa. On the other hand, the mode selecting switch 59 prohibits the input of the acceleration command SAa and the braking command SBa, whereby the traveling drive unit 52 excludes the acceleration command SAa and the braking command SBa, thus making it possible to control a traveling drive of a vehicle based upon the manual operation.

Further, the steering actuator 33 switches validity and invalidity of the torque command Ta input from the autonomous mode controller 61 according to the selecting state by the mode selecting switch 59. Therefore, when the torque command Ta is made valid, it is possible to perform the steering by the autonomous travel, and when the torque command Ta is made invalid, it is possible to perform the steering by the manual operation.

It should be noted that in the above-mentioned embodiment, the steering actuator 33 is the power steering device for assisting in the steering torque Tm. However, the present invention is not limited thereto. For example, the steering actuator 33 generates the assist torque T0 in response to the torque command Ta from the autonomous mode controller 61, and on the other hand, when the steering handle 32 is manually operated, the steering torque Tm may be transmitted to the output shaft 38 as it is without generation of the assist torque T0.

In the above-mentioned embodiment, the steering system 21 is provided with the steering mechanism 22 that steers the front wheels 6L, 6R by the steering cylinders 27L, 27R. However, the present invention is not limited thereto. For example, there may be adopted a steering mechanism that converts rotational torque of the output shaft 38 into a steering force of the front wheels 6L, 6R through a steering gear mechanism composed of a rack and a pinion.

In the above-mentioned embodiment, the dump truck 1 is provided with the autonomous mode controller 61. However, the present invention is not limited thereto. For example, a dump truck may be configured to be able to perform only a manual operation without using the autonomous mode controller 61. In this case also, by connecting the autonomous mode controller 61 to the traveling drive unit 52, it is possible to add the function of the autonomous mode later.

The above-mentioned embodiment is explained by taking the dump truck that is the large-sized haulage vehicle as a vehicle as an example, but the present invention is not limited thereto, and the dump truck according to the present invention may be applied to other vehicles such as a small-sized haulage vehicle.

DESCRIPTION OF REFERENCE NUMERALS

1: Dump truck (Haulage vehicle)
2: Vehicle body
6L, 6R: Front wheel
7L, 7R: Rear wheel
9: Engine
10: Main power generator
13L, 13R: Wheel drive motor
21: Steering system
22: Steering mechanism
27L, 27R: Steering cylinder
28: Hydraulic circuit
32: Steering handle (Steering operation device)
33: Steering actuator (Power steering device)
39: Steering angle sensor
41: Motor control device
50: Accelerator pedal (Acceleration operation device)
51: Brake pedal (Braking operation device)
52: Traveling drive unit
52A, 52B: External input terminal
53: Maximum value selecting part (Acceleration command selecting unit)
54: Maximum value selecting part (Braking command selecting unit)
55: Invalid output calculation unit
56: Accelerator output calculation unit
57, 58: Autonomous mode invalid switch
59: Mode selecting switch
61: Autonomous mode controller
62: Control communication unit
63: Local location calculation unit (Vehicle location calculation unit)
64: Behavior determination unit
65: Traveling control unit (Traveling trajectory trace unit)

The invention claimed is:

1. A haulage vehicle comprising:
an acceleration operation device that operates acceleration of a vehicle;
a braking operation device that operates a brake of said vehicle; and
a traveling drive unit that causes said vehicle to travel based upon an acceleration command by said acceleration operation device and a braking command by said braking operation device, characterized in that:
said traveling drive unit comprises:
an external input terminal for inputting another acceleration command and another braking command from an exterior;
an acceleration command selecting unit that selects a larger acceleration command by comparing said other acceleration command input from said external input terminal and said acceleration command by said acceleration operation device; and
a braking command selecting unit that selects a larger braking command by comparing said other braking command input from said external input terminal and said braking command by said braking operation device, wherein
a traveling drive of said vehicle is controlled based upon said acceleration command selected by said acceleration command selecting unit and said braking command selected by said braking command selecting unit.

2. The haulage vehicle according to claim 1, further comprising:
a steering operation device that operates a traveling direction of said vehicle;
a steering actuator that adds additional torque to steering torque of said steering operation device; and
a steering system that steers said vehicle based upon combined torque by combining said steering torque and said additional torque, wherein
said steering actuator generates said additional torque based upon a torque command from an exterior.

3. The haulage vehicle according to claim 2, wherein
said steering actuator is a power steering device that generates said additional torque for assisting in said steering torque.

4. The haulage vehicle according to claim 2, wherein
an autonomous mode controller is connected to said external input terminal of said traveling drive unit and said steering actuator to cause said vehicle to travel according to a predetermined travel trajectory, and
said autonomous mode controller includes:
a vehicle location calculation unit that calculates a position of said vehicle; and
a traveling trajectory trace unit that calculates said other acceleration command, said other braking command and said torque command based upon said vehicle position calculated by said vehicle location calculation unit and said predetermined travel trajectory.

5. The haulage vehicle according to claim 1, wherein
a mode selecting switch is connected to said traveling drive unit to permit or prohibit said other acceleration command and said other braking command from being input from an exterior.

6. The haulage vehicle according to claim 2, wherein
a mode selecting switch is connected to said traveling drive unit to permit or prohibit said other acceleration command and said other braking command from being input from an exterior, and
said steering actuator switches validity and invalidity of said torque command input from an exterior according to a selecting state of said mode selecting switch.

* * * * *